United States Patent [19]

Mroz et al.

[11] Patent Number: 4,457,473
[45] Date of Patent: Jul. 3, 1984

[54] TAPE CARTRIDGE HOUSING

[75] Inventors: Edward Mroz, Menlo Park; Richard J. Wesendunka, Campbell, both of Calif.

[73] Assignee: Data Electronics, Inc., San Diego, Calif.

[21] Appl. No.: 385,120

[22] Filed: Jun. 4, 1982

[51] Int. Cl.³ .................. G03B 1/04; G11B 15/32
[52] U.S. Cl. ................................... 242/192; 242/199
[58] Field of Search ................. 242/192, 197–200, 242/188; 360/71, 73, 93, 132, 96.1, 96.3

[56] References Cited

U.S. PATENT DOCUMENTS

| | | | |
|---|---|---|---|
| 2,971,716 | 2/1961 | Sampson | 242/188 |
| 3,819,130 | 6/1974 | Moxness | 242/199 |
| 3,829,040 | 8/1974 | Nelson | 242/199 |
| 4,102,516 | 7/1978 | Anglin et al. | 242/192 |
| 4,162,774 | 7/1979 | Bowers | 242/192 |
| 4,166,593 | 9/1979 | Milants | 242/199 |
| 4,172,569 | 10/1979 | Newell | 242/192 |
| 4,199,794 | 4/1980 | Pfost et al. | 360/92 |

Primary Examiner—Leonard D. Christian
Attorney, Agent, or Firm—Christie, Parker & Hale

[57] ABSTRACT

An improved tape cartridge includes a housing having a rigid base member and means for covering the base member. The base member is a one-piece structure having a bottom of flat-cross-section and a plurality of holes extending through the bottom. The base member includes three side walls with two side walls being opposed and the side walls extending upwardly generally perpendicular to the bottom. Preferably, the base member is die casted and made from aluminum alloy. The housing includes a resilient cover, preferably made from plastic which does not distort the base member's flatness upon assembly. The cover has a front wall which extends downward generally perpendicular to a top portion of the cover and the front wall has an open face. Means for connecting the cover and base member are included.

7 Claims, 5 Drawing Figures

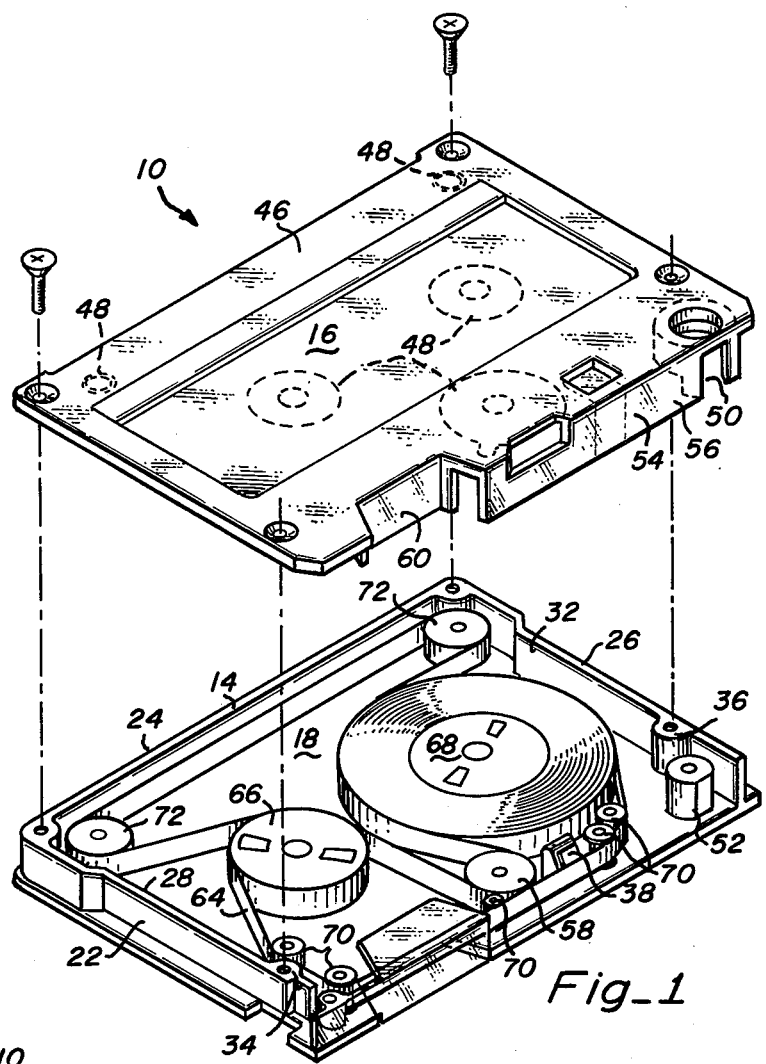
Fig_1
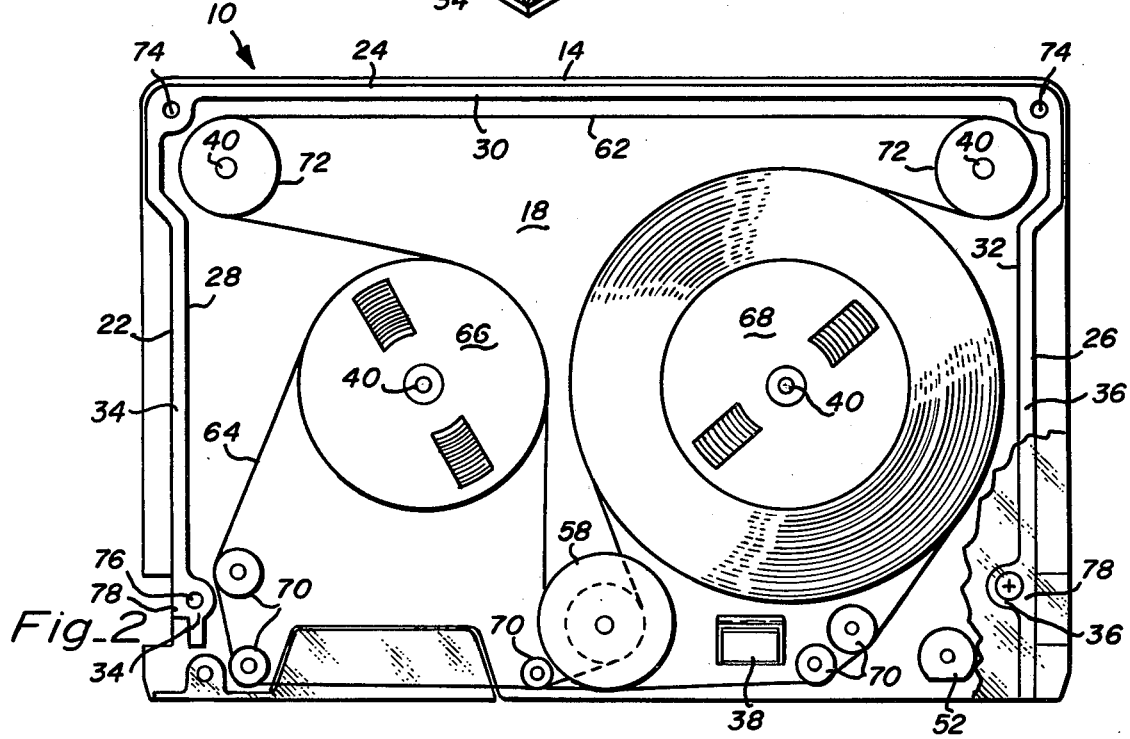
Fig_2

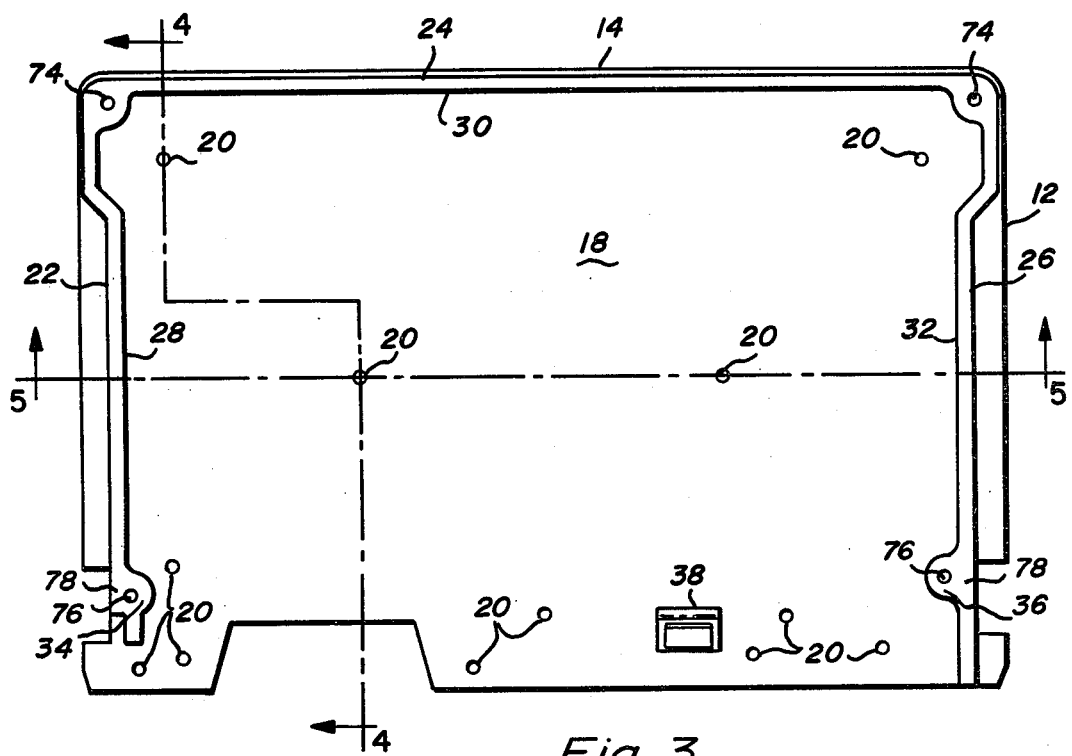
Fig_3
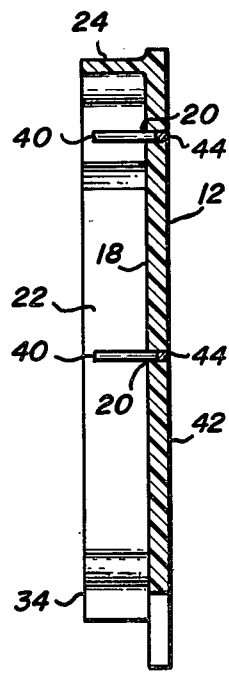
Fig_4
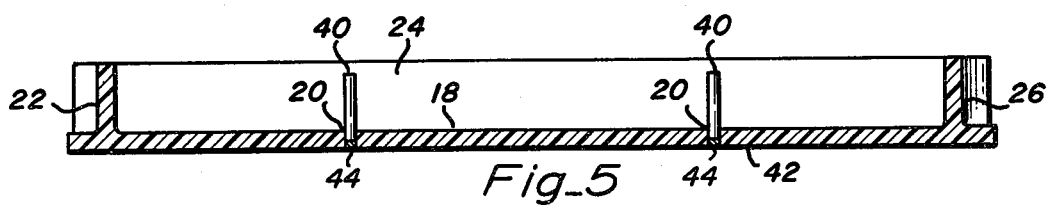
Fig_5

TAPE CARTRIDGE HOUSING

BACKGROUND OF THE INVENTION

1. Field of the Invention

This invention relates to magnetic tape cartridges, and more particularly to magnetic tape cartridge housings having a rigid base member and a resilient cover.

2. Description of the Prior Art

Belt driven magnetic tape cartridges have been available for some time. The cartridge typically includes a housing and various internal components such as tape, rotatable tape spools, and rollers on pins, belt drive means and the like. The housing includes a base plate, usually metal sides; and a cover, usually rigid plastic material. The housing typically includes means for connecting the cover to the sides and base plate. Typically, glue or removable connection screws are used.

In 1971, Phillips made available three-part metal frame cassettes, e.g. model LGH6003 and LGH6005. The cassette includes a metal frame cast in a composite mold having a movable third mold section which can form cassette guiding surfaces which are true cylinders perpendicular to the support planes. The cassette includes two thin plastic covers which are mounted on the upper and lower sides of the metal frame. The metal frame constitutes the tape guide and the side walls of the cassette housing. For a more detailed explanation of such cassettes, see Milants, U.S. Pat. No. 4,166,593, col. 2, lines 46–65.

Typically, belt drive cartridge housings include a base plate made in one punching operation. The plate is then thermo-flattened and a plurality of holes are machined (counter-sunk) on the base plate. A cover with four walls made from rigid plastic material fits over the base. The cover is typically held in place by four screws sunk into plastic standoffs in the cover and screwed into the base. When assembled it has been found that many of these cartridges lose their flatness. Additionally, it has been found that when pins are pressed into the base plate, even when great care is used, there is a tendency for them to become non-perpendicular, causing unsatisfactory cartridge performance and detracting from cartridge longevity.

As demand for backing up data stored on non-removable rigid disks has increased, the demand for precise tape transport cartridges also increased. Formerly, ¼" tape cartridge capacity of three Mega Bytes was acceptable. Now, expected storage capacity is upwards of 40 Mega Bytes with recording densities of 10,000 FRPI (flux reversals per inch). The number of tracks has risen from four to ten more. Tape speed also has increased from 30 inches per second (IPS) to 90 IPS. These demands place high requirements on precise tape transport.

Current tape transport of belt driven magnetic tape cartridges needs to be improved to meet the above demands. One problem in meeting the increasing demands is the base plate, the foundation of tape transport systems. Additionally, the current pressed-in pins do not fall within adequate perpendicularity tolerances, they also cause vertical tape guiding and uniform speed results to be unsatisfactory for increased performance.

Improvements in tape cassettes have been made. For example, Milants U.S. Pat. No. 4,166,593 discloses a housing for a magnetic tape cartridge and a method of molding the housing. The housing includes a molded plastic lower part and a molded plastic cover. The lower part (base plate) includes a tape guide unit extending between two true cylindrical tape guides. The tape guide is integral with cassette locating surfaces. Milants also discloses reinforcement ridges in the lower part for improving the rigidity of the cassette. Milants is an inexpensive cassette having low rigidity, and the cover is specifically recited as being rigid (col. 1, lines 50–54).

Anglin et al, U.S. Pat. No. 4,102,516 discloses a belt driven magnetic tape cartridge having an improved tape tensioning system of the type which may be used in connection with the instant invention, that patent is incorporated herein by this reference. The corner rollers of the belt drive system include a bowed washer with a central portion having a hole receiving the pressed-in roller pin and bearing against an end of the roller, with a pair of arms bearing against the cartridge frame, whereby a small amount of drag may be imparted to the roller.

Singer et al, U.S. Pat. No. 4,032,987 discloses an injection molded cassette including a reflective portion which is placed in reflective alignment between a light emitting device and a light receiving device to provide automatic motor shut-off of the tape machine.

SUMMARY OF THE INVENTION

The present invention provides an improved tape cartridge housing having improved strength, rigidity, and flatness. The base member and cover have improved overall mechanical integrity for precision tape transport.

The present invention also provides a rigid base member having holes through its bottom for aligning and maintaining installed pins perpendicular to the base member bottom for precision tape transport.

The cartridge of the instant invention includes a rigid one piece base member having a bottom with a flat cross-section and a plurality of holes extending through the bottom. The base member includes three side walls, with two side walls being opposed, the side walls extending upwardly generally perpendicular to the bottom. The housing includes a resilient means for covering the base and having a top with a front wall extending downwardly generally perpendicular to the top. The front wall has a generally open face. The housing includes means for connecting the covering and base member. When assembled, the resilient covering means does not distort the flatness of the rigid base, thereby preserving the mechanical integrity of the base for precision tape transport.

Preferably, the base member is die casted out of aluminum alloy, or manufactured from plastic. Metal die casting or plastic structure provides the base member with the required rigidity and enables the mirror prism to be integral with the base member, again promoting base member rigidity. The die casting or plastic structure imparts an attractive appearance to the housing making it more cosmetically appealing. Additionally, the die casting or plastic structure of the base member makes tolerances easier to meet.

The base member preferably includes reinforced walls defining structural ribs which are preferably recessed to provide means for tape support. The ribs again promote structural rigidity, making flatness distortion more difficult. Additionally, the base member provides better high frequency damping characteristics as well as better heat sink capabilities.

The preferred means for covering the base member is a lightweight resilient plastic cover having a generally flat top and a generally open downwardly extending front wall. The cover has an interior surface with bosses defining washer means aligned with the pins for maintaining the revolving components without additional retainers. Since no springs or washers are required for the revolving roller, tape tension is controlled by viscous friction and belt tension.

The housing includes means connecting the covering means and base member. Preferably, holes extend through the reinforced opposing side walls and are aligned with similar holes in the covering means. Screws are then threaded through the covering means and into the base member for completing assembly. The base member holes are preferably found at the juncture of adjacent side walls and the distal end of opposed side walls and extend through the base member bottom.

The improved cartridge made from the housing, as described above, is simply assembled; and provides more rigid foundation for tape transport for meeting current and expected economic and technical demands for disk back-up systems.

These and other objects and advantages of the present invention will be better understood by referring to the following detailed description and the accompanying drawings.

DRAWINGS

FIG. 1 is an exploded perspective view of a belt drive ¼" magnetic tape cartridge in accordance with the present invention;

FIG. 2 is a top view of the cartridge of FIG. 1 with the cover partially cut away;

FIG. 3 is a top plan view of the base member of the cartridge of FIG. 1;

FIG. 4 is a cross-sectional view of an opposing side wall of the base member and taken along line 4—4 of FIG. 3; and FIG. 5 is a cross-sectional view of the base member taken along the line 5—5 of FIG. 3.

DETAILED DESCRIPTION OF THE PREFERRED EMBODIMENT

Illustrated in FIG. 1 and denoted by the general reference numeral 10, is a belt driven magnetic tape cartridge of the preferred embodiment. The cartridge 10 includes a housing 12 and various internal components such as tape and tape transporting and aligning hardware as will be explained in more detail below. The housing 12 includes a base member 14 and a cover 16 providing a means for covering the base defining a cover 16.

As illustrated by FIGS. 2 and 3, the base member 14 is a die casted one piece member. The base member has a bottom 18 which has a flat cross-section and a plurality of openings 20 as will be appreciated more fully with reference to FIG. 5. The openings 20 extend generally perpendicular through the bottom 18. The base member 14 also includes three side walls 22, 24 and 26. As will be appreciated, side walls 22 and 26 are opposing and side walls 22 and 24 and sidewalls 24 and 26, respectively are adjacent. The side walls 22, 24 and 26 extend upwardly generally perpendicular to the bottom 18.

The base member 14 is rigid and preferably made from aluminum alloy and most preferably aluminum 383. Rigidity is increased by reinforcing side walls 22, 24 and 26 with ribs 28, 30 and 32 defining structural support members. A pair of distal end regions 34 and 36 of side walls 22 and 26, respectively, are identically recessed inwardly as shown in FIGS. 2 and 3 for defining tape supports.

The base member 14 also includes an integral mirror prism 38 rising from the bottom 18. In past structures, the mirror prism has not been integral with the base. Making the prism 38 an integral part of the die casted base member 14 adds to the structural rigidity of the cartridge 10.

As mentioned previously, it is an object of this invention to have and maintain a flat base member bottom 18. As a result of die casting from aluminum alloy, it has been found that flatness of the bottom can be manufactured at 0.003". As will be discussed more fully below, the cover 16 does not distort the base member 14 significantly after assembly.

As illustrated by FIG. 3, there are a plurality of openings 20 extending through base member 14. The openings 20 are drilled through the bottom 18 as shown in FIG. 5. Pins 40 are guided through the entire thickness of bottom 18 to provide excellent support for the pins 40. However, as shown in FIG. 5, it is preferable to guide pins 40 somewhat short of a bottom exterior surface 42. A plurality of plugs 44, preferably of plastic, are then used to fill the remaining portion of openings 20 making the exterior surface 42 smooth as well as flat.

Preferably the thickness of the side walls 22, 24 and 26 and bottom is approximately 0.100" but can be as low as between 0.080" to 0.090".

With reference to FIG. 1, the cover 16 is made from resilient plastic material so that when base member 14 and cover 16 are assembled, the cover 16 does not distort the flatness of the base member 14. The cover 16 has a generally flat top 46 with an exterior surface and an interior surface. The interior surface includes a washer means 48 integral with the cover 16 for retaining the pins 40 in place during operation of the cartridge 10. The cover 16 includes an opening 50 for operating a rotatable write lock-out knob 52 (FIG. 2).

The cover 16 has a front wall 54 extending downwardly generally perpendicular to the top 46. The front wall has a generally open face 56 to accomodate a drive belt roller 58, write-lock-out knob 52 and various internal components of the cartridge 10. Face 56 further includes a door stop and tape head opening 60 recessed from the edge of front wall 54.

As will be appreciated, the cartridge 10 includes various internal components including tape and tape transporting and aligning hardware. Since these components do not reflect on the inventive nature of the cartridge they will not be explained in detail here. It should be noted that, as with conventional belt drive cartridges, there are two tape loops, an inside the belt drive tape loop 62 which drives an outside recording tape loop 64 moving the tape from a rotating spool 66 to another rotating spool 68. A plurality of tape guiding and aligning guides 70 keep the tape aligned across the tape head opening 60. The guides 70, the spools 66 and 68, a drive belt roller 72 and the roller 58 all rotate freely.

The housing 12 includes means for connecting the cover 16 to base member 14. As shown in FIGS. 1 and 2, the means for connecting the cover 16 to base member 14 includes the reinforced side walls 22, 24 and 26 having a threaded opening 74 at the juncture of adjacent side walls 22 and 24 and 24 and 26, respectively. Opposing side walls 22 and 26, each having a threaded opening 76 at distal ends 78 of each opposing side walls 22 and 26. A distal end 78 and the juncture of adjacent side walls 22 and 24 and 24 and 26 are reinforced and define bosses. The bosses facilitate in minimizing the thickness of the side walls while preserving rigidity and mechanical integrity of base member 14. Screws may then be threaded through the cover 16 and base member 14 for connection.

Although the present invention has been described above in terms of the presently preferred embodiments, it should be understood that such disclosure is not considered to be limiting. Accordingly, it is intended that the appended claims be interpreted as covering all alterations and modifications, all with the true spirit and scope of the invention.

We claim:

1. A belt driven magnetic tape cartridge housing, comprising:
   a rigid one-piece base member including a bottom wall having a flat cross-section and a plurality of holes extending through the flat bottom of the base member, the base member including three side walls, two of which side walls are opposed, said side walls extending upwardly generally perpendicular to the bottom wall;
   a resilient covering means for covering the base, the covering means including a top wall and a front wall, said front wall extending downwardly generally perpendicular to the top wall, said front wall having a generally open face;
   means for connecting the covering means and the base member, whereby, when assembled, the base member remains flat in cross-section and undistorted by the resilient covering means; and
   a plurality of pins secured in the holes through the flat bottom of the rigid base member for aligning and maintaining the installed pins perpendicular to the base member bottom for precision transport of a tape wound on rotating spools mounted on the pins.

2. A housing as set forth in claim 1 wherein the base member is die casted.

3. A housing as set forth in claim 2 wherein the base member is made from aluminum alloy.

4. A housing as set forth in claims 1 or 2 wherein,
   said side walls are reinforced and the distal end zone of opposing side walls are recessed identically inwardly from the edge of the bottom defining structural support members and means for tape support.

5. A housing as set forth in claim 2 wherein,
   the interior of the covering means includes washer means integral with the covering means for retaining spool cartridge pins and roller pins in place during operation of the cartridge.

6. A housing as set forth in claim 4 wherein,
   the interior of the covering means includes washer means integral with the covering means for retaining spool cartridge pins and roller pins in place during operation of the cartridge.

7. A housing as set forth in claim 4 wherein,
   the means for connecting the base member to the covering means comprises threaded openings in said side walls at the juncture of adjacent side walls and threaded openings at the distal end of each opposed side wall.

* * * * *

UNITED STATES PATENT AND TRADEMARK OFFICE
CERTIFICATE OF CORRECTION

PATENT NO. : 4,457,473

DATED : July 3, 1984

INVENTOR(S) : Edward Mroz, Richard J. Wesendunk

It is certified that error appears in the above-identified patent and that said Letters Patent is hereby corrected as shown below:

On the title page, change inventor's name from "Wesendunka" to --Wesendunk--.

Col. 3, line 20, change "and provides" to --and it provides--.

Col. 5, line 1, change "walls" to --wall--.

Signed and Sealed this

Fifth Day of November 1985

[SEAL]

Attest:

DONALD J. QUIGG

Attesting Officer

Commissioner of Patents and Trademarks